United States Patent Office 3,378,473
Patented Apr. 16, 1968

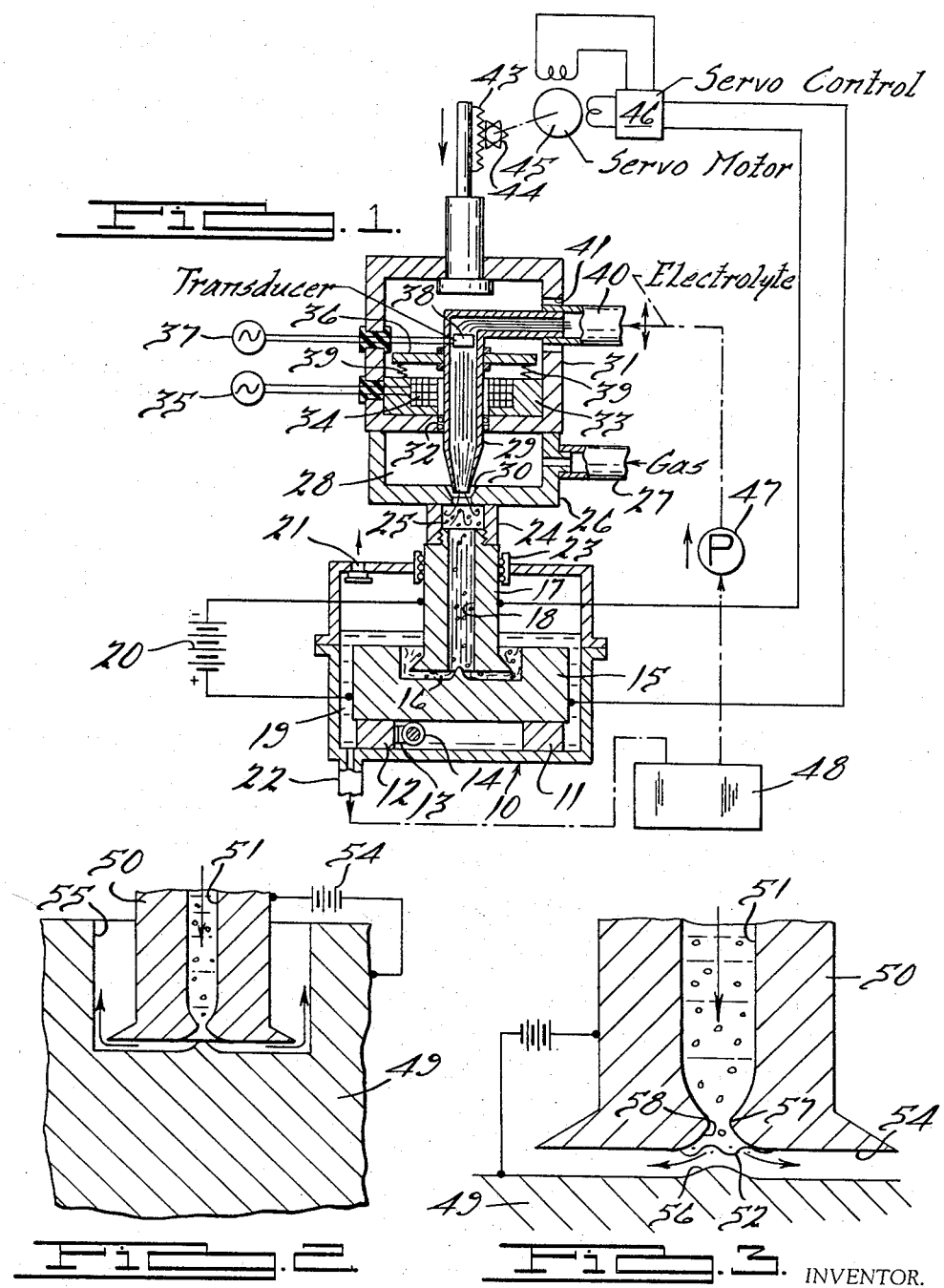

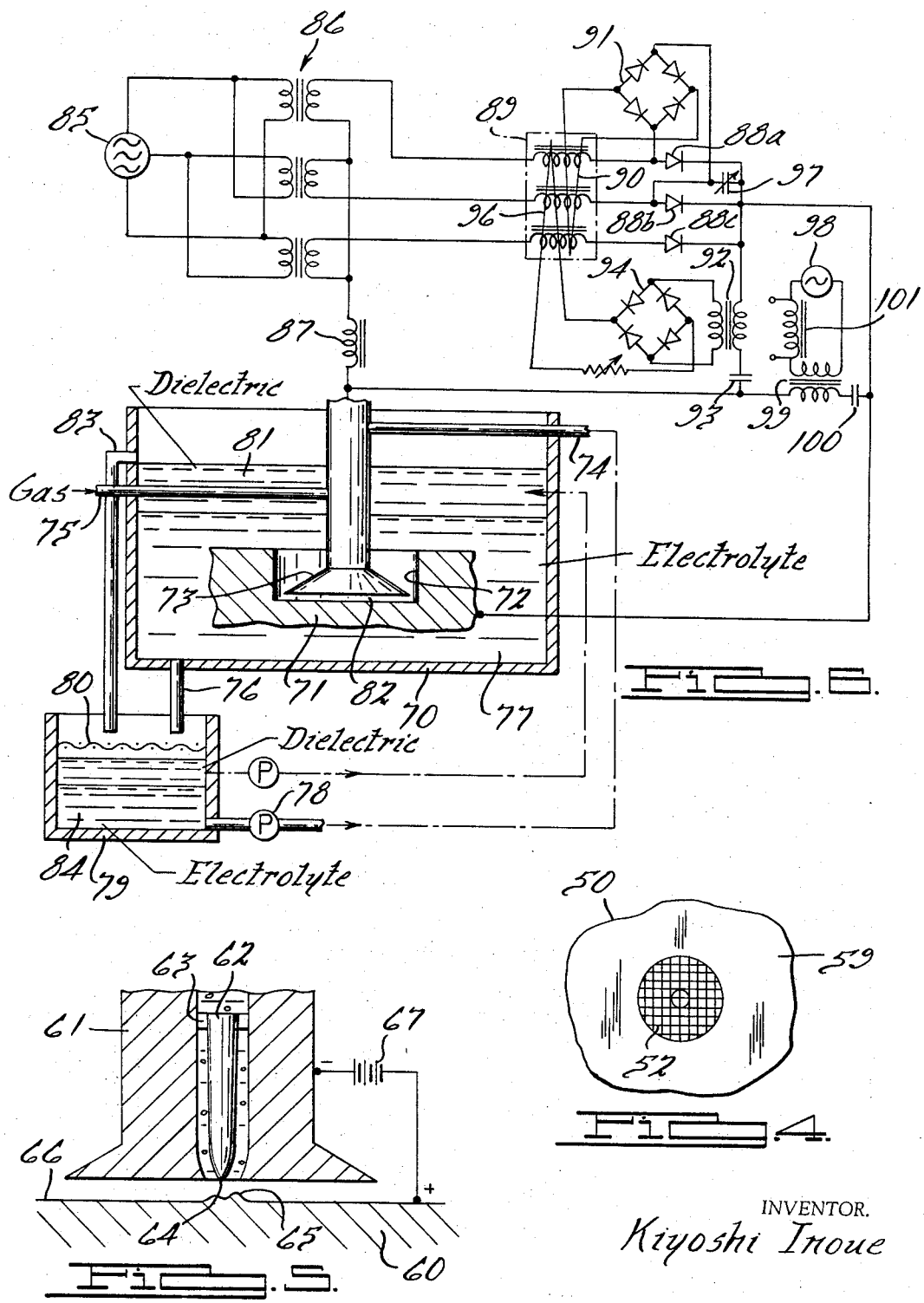

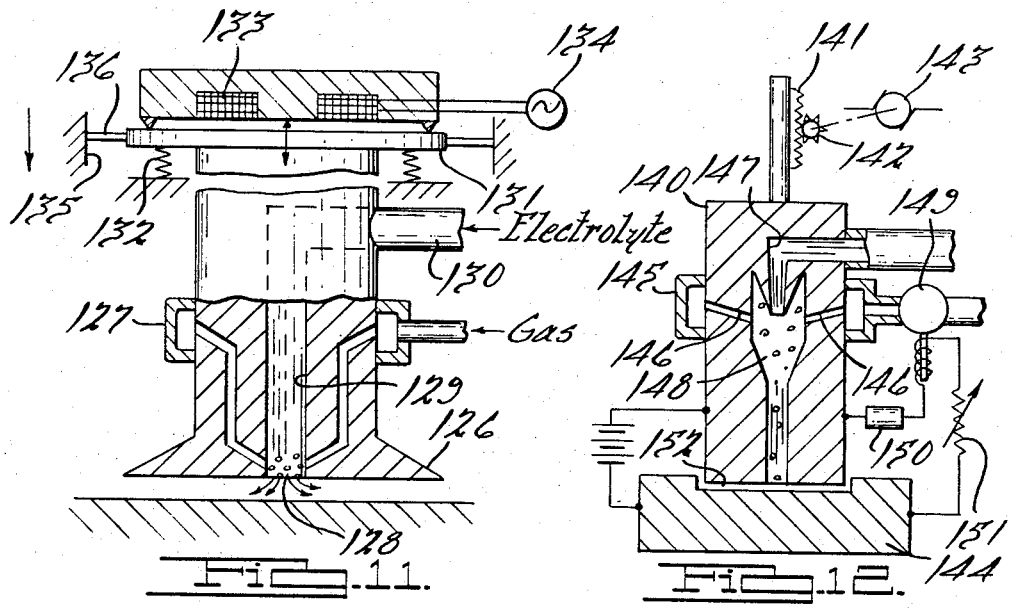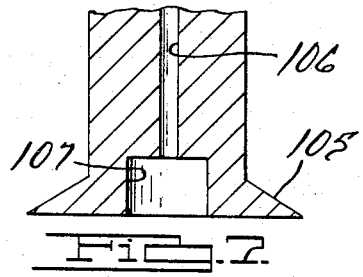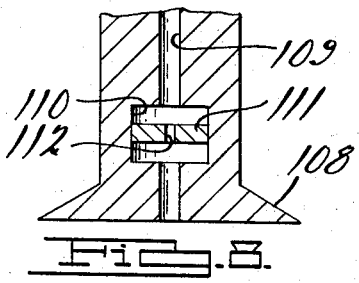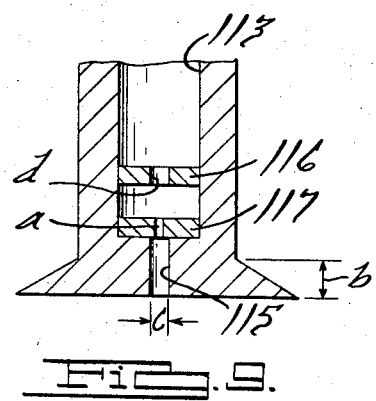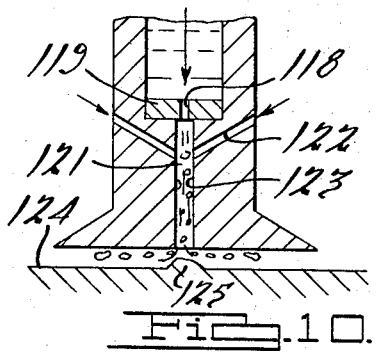

3,378,473
METHOD OF ELECTROCHEMICALLY MACHINING INCLUDING CONTROLLING THE FLOW OF GAS-CONTAINING ELECTROLYTE IN RESPONSE TO GAP VOLTAGE
Kiyoshi Inoue, 182 3-chome, Tamagawayoga-machi, Setagaya-ku, Tokyo, Japan
Continuation-in-part of application Ser. No. 342,565, Feb. 4, 1964. This application Apr. 2, 1964, Ser. No. 356,713
Claims priority, application Japan, Feb. 5, 1963, 38/5,435, 38/5,436; Mar. 1, 1963, 38/10,885; Mar. 19, 1963, 38/14,735, 38/14,737; Apr. 13, 1963, 38/19,277; May 13, 1963, 38/25,068; Aug. 12, 1963, 38/42,704
2 Claims. (Cl. 204—143)

My present invention relates to the electrochemical machining of conductive workpieces and, more particularly, to an improved method of machining of workpiece surfaces by the electrolytic erosion of portions of the workpiece juxtaposed with an electrode. This application is a continuation-in-part of my copending application Ser. No. 342,565, filed Feb. 4, 1964, now U.S. Patent 3,252,-881 as a continuation-in-part of copending application Ser. No. 316,955, filed Oct. 17, 1963, the latter being, in turn, a continuation-in-part of my copending applications Ser. No. 19,685, now U.S. Patent 3,223,603, and 106,360, now abandoned filed Apr. 4, 1960 and Oct. 28, 1961 respectively.

In the copending application Ser. No. 316,955, I have pointed out that the electrochemical machining of conductive workpieces, i.e., the electrolytic erosion of workpiece portions juxtaposed with an electrode, is characterized by a nonuniform current-density distribution across the gap separating the electrode surface from the workpiece surface to be machined. This nonhomogeneous current distribution apparently derives from an ionic contamination in the form of accumulations or concentrations of ions or ionically charged particles along one or the other surface as a consequence of the polarities of the surfaces. Moreover, the nonuniform distribution of the flow of current between the surfaces was also found to be, in part, a function of magnetic effects resulting from the passage of current between the electrode and the workpiece.

In accordance with this copending application and the principles set forth therein, the ionic contamination in the gap between the juxtaposed spaced surfaces of the electrode and the workpiece could be eliminated by superimposing upon the essentially unidirectional current applied between the electrode and the workpiece, a high-frequency alternating current which apparently had the effect of permitting the dislodgment of ions or ionic particles adherent at the electrode or workpiece surfaces. The use of a high-frequency electric current, superimposed upon the unidirectional current, apparently eliminates ionic concentrations by promotion of inter-ion collisions and neutralization in the stream of electrolyte passing through the gap. Moreover, the substantial advantages of a system wherein the electrolyte is passed through the electrode were also emphasized in this application. In the parent application, Ser. No. 342,565, of the present case, I disclose an improved apparatus for obviating the aforementioned disadvantages.

It is the principal object of the present invention to provide a method of electrolytically machining conductive workpieces whereby disadvantageous ionic contamination is eliminated or reduced.

A further object of this invention is to provide a relatively simple and inexpensive method for electrochemically machining metallic workpieces whereby the electrolyte/flow rate, the machining current and/or the electrolyte pressure can be reduced without a noncommittent reduction of machining efficiency.

According to the principles of the present invention, and the essential characteristics of my copending application Ser. No. 316,955, which emphasizes that a decrease in ionic contamination within the gap between the electrode surface and the confronting workpiece surface can permit a reduction in the electrolyte flow rate and/or pressure, I have found that ionic contamination can be markedly reduced if not entirely eliminated by the step of, in the electrochemical machining of a metallic workpiece, inducing the mechanical dislodgment of any ionic particles which might otherwise tend to accumulate at the electrode or workpiece surface. More specifically, I have discovered that it is possible to substantially completely eliminate ionic contamination by promoting turbulence of the electrolyte passing through the working gap, especially by injecting into the electrolyte stream passing through the electrode a gaseous fluid, which is entrained by the electrolyte stream and effectively serves to sweep ionic particles out of the gap. While the mechanism for this action is not wholly clear, it appears that the gaseous fluid, in the form of bubbles, acts to promote turbulence and thus eliminate dead spaces or regions of negative pressure at the outlet of the electrode proximal to the working surfaces. A further possible mode of operation is via preferential adsorption of ionic particles to the bubbles of gas sweeping through the working gap. At any rate, the mere injection of a gas stream into the electrolyte supplied to the working gap effects an improvement of the working efficiency to such extent that the electrolyte-flow rate and/or pressure can be reduced to approximately one-third of their magnitudes in the absence of this gas stream. Moreover, the introduction of electrolyte into the working gap between the electrode and the workpiece frequently results in the formation of a dead space with respect to electrolyte flow axially forwardly of the outlet for the electrolyte and the reduced erosion of the electrode surface at this location. This cavitation or formation of a dead space within the otherwise rapidly moving stream of electrolyte produces radial ridges (e.g., so-called spider webs) or protuberances in line with the outlet which hitherto could be eliminated only by movement of the electrode relatively to the workpiece. The ridge-producing phenomenon, which may be a consequence of the laminar flow of electrolyte out of the electrode outlet and along the electrode and workpiece surfaces in the gap in radial direction, can be reduced or entirely eliminated by the use of gas bubbles entrained by the electrolyte stream. In practice, it has been found that such relative movement merely produces a series of ridges or protuberances in many cases and is not wholly satisfactory to eliminate such ridges and protuberances as tend to form upon cavitation in the electrolyte stream. The incorporation of a gaseous fluid in the liquid electrolyte apparently markedly reduces such cavitation and insures a more homogeneous rate of electrolyte flow with consequent machining uniformity. For this purpose, substantially any gaseous fluid will be found to be suitable although preference is given to the more common and relatively chemically inert gases, with respect to oxidation of the workpiece, such as air, nitrogen, carbon dioxide, and hydrogen, it being preferable to use nonflammable gases for convenience in handling.

According to another feature of this invention, ionic contamination is reduced substantially by promotion of a turbulence in the electrolyte streaming through the electrode, e.g. by providing in the latter at least one and preferably more constrictions proximal to or distal from the outlet. These constrictions may operate in conjunction with means for feeding a gaseous fluid into the electrolyte so that, for example, a constriction of this type can form a reduced-pressure compartment within the electrode into which the gas is drawn. Furthermore, I have discovered that it is possible to effect mechanical dislodgment of ionic contaminants by applying to the electrode a mechanical oscillation toward and away from the workpiece of a relatively low or sonic frequency (e.g. from 10 cycles/seconds to 10 kilocycles/second). A similar result is obtained when, concurrently with the mechanical vibration of the electrode and the injection of a gaseous fluid into the electrolyte or as an alternative thereto, a supersonic vibration is applied to the electrolyte within the electrode in accordance with the principles advanced in my copending application Ser. No. 322,932, filed Nov. 12, 1963. The supersonic vibration can have a frequency ranging between substantially 10 kilocycles/second and 10 megacycles/second and can be produced by an electrosonic transducer mounted within the interior of the tubular electrode.

The above and other objects, features and advantages of the present invention will become more readily apparent from the following description, reference being made to the accompanying drawing in which:

FIG. 1 is a somewhat diagrammatic cross-sectional view through an electrochemical-machining apparatus embodying the present invention;

FIG. 2 is an axial cross-sectional view illustrating a detail of an electrode construction according to this invention;

FIG. 3 is a view of a portion of FIG. 2 drawn to a larger scale;

FIG. 4 is an end view of a fragment of the electrode of FIG. 3;

FIG. 5 is a view similar to FIG. 3 of a modification;

FIG. 6 is a view similar to FIG. 1 illustrating another aspect of this invention;

FIG. 7 is an axial cross-sectional view of the outlet portion of an electrode embodying the present invention;

FIG. 8 is a view similar to FIG. 7 showing a modified electrode;

FIG. 9 is another view similar to FIG. 7 diagrammatically illustrating a further variant;

FIG. 10 is a view similar to FIG. 7 illustrating means for introducing a gaseous fluid into the electrolyte in conjunction with a construction within the electrode;

FIG. 11 is an axial cross-sectional view, partially in elevation, diagrammatically illustrating another aspect of this invention; and FIG. 12 is an axial cross-sectional view similar to FIG. 1 of a portion of an electrochemical machining apparatus.

In FIG. 1 I show a housing or reservoir 10 adapted to receive a liquid electrolyte 19 which is circulated through the gap 16 between an electrode 17 and a workpiece 15 juxtaposed therewith. The workpiece 15 is mounted upon blocks 11, 12, the latter of which is provided with a rack 13 engageable by a worm 14 whereby the workpiece 15 can be displaced relatively to the electrode 17 in a direction transverse to this electrode. The electrode is generally tubular and formed with an interior bore 18 through which electrolyte is fed to the gap 16 as will be described in greater detail hereinafter. A battery 20 is connected across the electrode 17 in the workpiece 15; housing 10 is provided with an outlet 22 via which electrolyte is led to a reservoir and filter 48 for return to the electrode bore 18 by means of pump 47. Another outlet 21 is provided in the housing 10 to permit the escape of gas therefrom.

The electrode 17 is mounted in a bearing 23 for axial displacement relatively to the housing 10 and is connected via a bushing 24 with a support 26 forming a gas plenum 28 around a Venturi nozzle 29. Gases introduced into the plenum 28 via an inlet 27 join the electrolyte stream at the Venturi nozzle 29 communicating with an enlarged compartment 25 via the annular passage 30; the passage 30 forms a constriction for the electrolyte as well as a Venturi injector drawing gas from the plenum into the interior 18 of electrode 17. The nozzle 29 is also mounted in a bearing 22 for axial displacement relatively to the support 26 which is connected to a housing portion 31. The latter receives a support yoke 33 in which is embedded an electromagnetic coil 34 energized at sonic frequencies by alternating current source 35. When a frequency ranging between 10 cycles/second and 10 kilocycles/second is applied to the magnetically permeable nozzle 29, the latter is oscillated axially against the force of restoring springs 39, which act upon plate 36 connected to the nozzle 29, the nozzle 29 producing a succession of electrolyte pulses which are delivered to the gap 16 and serve to dislodge ionic contaminants within this gap. An opening 41 in housing portion 31 is sufficiently large to permit axial reciprocation of the nozzle 29 whose inlet 40 is fed with electrolyte from the pump 47.

An electrosonic transducer 38 is disposed within the nozzle 29 to provide an ultrasonic vibration, generally at a frequency between 10 kilocycles/second and 10 megacycles/second, but is preferably 50 to 500 kilocycles/second, upon energization by a high-frequency alternating current source 37. The housing portion 31 can be displaced by a pinion 44 and a servomotor 45 responding, via servocontrol 46, to the voltage across the gap 16 in order to maintain the latter substantially constant. Pinion 44 meshes with a rack 43 of a rod 42 entraining the housing portion 31. The turbulence within the electrolyte is further promoted by the constriction 30 and the enlarged chamber 25. Both the introduction of gas into the electrolyte and sonic or ultrasonic vibration of the electrode and/or electrolyte promotes dislodgment of ionic contaminants, the remainder of the operation of the apparatus being substantially similar to that of the apparatus described in my copending application Ser. No. 316,955.

In FIGS. 2–4, I show an arrangement wherein an electrode 50 has its interior cavity 51 supplied with electrolyte and gas as previously described but is further equipped with an apertured conductive member 52 spanning the outlet of the electrode 50 in the region in which it is juxtaposed with the workpiece 49 in the cavity 53 formed by the electrode. Battery 54 supplies the essentially unidirectional current across the electrode and workpiece. As will be more fully evident from FIGS. 3 and 4, the conductive member is a screen whose apertures constitute constrictions promoting turbulence in the region axially forwardly of the outlet, this region normally constituting a dead space because of cavitation effects. The enlarged hump 56 in this region is substantially diminished by the provision of the conductive member 52, the latter serving to maintain a substantially uniform current density throughout the gap even in tthe region free from solid portions of the electrode. When the electrode is composed of copper or brass, the screen 52 may be of similar composition. While any mesh screen or perforated plate is suitable, it has been found that a mesh ranging between 50 and 300 mesh yields effective results. It should be noted that the interior of electrode 50 is also formed with a constriction 57 rearwardly of the screen 52 and with a reduced-pressure chamber 58 forwardly of the constriction 57. This arrangement further insures the promotion of turbulence at the outlet and effects a still greater reduction in the height of the hump 56 which is exaggerated in the drawing or purposes of illustration.

In FIG. 5, I show another system whereby cavitation effects and a nonuniformity of current distribution can be eliminated. In this arrangement, the electrode 61 has its interior formed with a conductive body 62 connected by web 63 to the remainder of the electrode 61. The conductive body 62 terminates at the outlet of the electrolyte channel within the electrode and is juxtaposed with the workpiece 60 whose surface 66 is machined by the electrode and the workpiece from battery 67. The body 62 ensures the development of the relatively high current density in the region of the hump 65 so that across the entire outlet region of the electrode, a current density substantially equal to that developed in the remainder of the gap can be maintained. The body 62 can be blunt ended or pointed at 64 in order to increase the current density still further; moreover, the body 62 serves to form a constriction within the electrode 61 and thus promotes turbulence at the outlet.

In the system of FIG. 6, the receptacle 70 supports the workpiece 71 whose cavity 72 is formed by a tubular electrode 73 supplied with electrolyte via an inlet 74 and with gas by way of tube 75. Receptacle 70 has an outlet 76 at its bottom for draining electrolyte 77 from the receptacle, this electrolyte being supplied to tube 74 by a pump 78. The reservoir 79 for the liquid is provided with a screen 80 constituting a filter and adapted to remove metallic particles from the electrolyte. As described in my copending application Ser. No. 316,955, a layer 81 of a dielectric liquid overlies the electrolyte bath to prevent splattering of electrolyte as the latter emerges from the gap 82 between the electrode 73 and the workpiece 71. An overflow 83 returns excess dielectric to the reservoir 79 where, because of its lower specific gravity, it overlies the electrolyte 84; a suitable dielectric is kerosene.

A three-phase source 85 of electric current energizes the three-phase transformer 86 whose three secondary windings are connected via a choke 87 to the electrode 73 which is thus rendered negative. The other terminal of each central winding supplies a respective rectifier 88a, 88b, 88c, via a respective winding of a saturable-core- reactor 89, whose biasing winding 90 is connected across the direct-current terminal of a rectifier bridge 91. The positive output of the rectifier 88a–88c is tied to the workpiece 71. The system is also provided with diagrammatically illustrated means for maintaining the power supplied to the electrode substantially proportional to the width of the working gap; such means includes a transformer 92 whose primary winding is connected in series with a condenser 93 and constitutes a sensing device responsive to the pulsating direct current applied across the working gap. The secondary winding of transformer 92 supplies a rectifier bridge 94 whose DC terminals are connected in series with an adjusting resistor 95 and the control winding 96 of the saturable reactor. As the working gap increases, the resistance to current flow between the electrode and the workpiece increases proportionally, this variable voltage drop being detected by the transformer 92 and converted into a control signal which activates control winding 96 to increase the power supplied across the gap. Variable capacitor 97, connected across rectifier 88b, constitutes a current-reversing element of the type described in my copending application Ser. No. 316,955 operable to permit machining of materials such as tungsten carbide.

An alternating current source 98 is connected to a coupling transformer 99 whose secondary winding, in series with a DC blocking condenser 100, applies a high-frequency alternating current across the electrode and workpiece to reduce ionic contamination in accordance with the principles advanced in the latter copending application. A saturable reactor 101 can be energized to control the power of this high-frequency current superimposed upon the direct current of rectifiers 88a–88c.

FIG. 7 shows an electrode 105, in accordance with the presnt invention, whose central bore 106 terminates in an enlarged comparement 107, so that the gas, introduced under pressure into the liquid electrolyte, can expand expand prior to egress from the electrode and produce a turbulence sufficient to prevent the formation by cavitation of dead spots. In the modification of FIG. 8, the electrode 108 has its internal bore formed with an expansion chamber 110 which, however, receives a partition 111 having a narrow aperture 112 constituting a turbulence in promoting constriction. In the modification of FIG. 9, the large-diameter bore of electrode 114 is provided with a constricted outlet 115 in which the Reynold's number of the electrolyte flow is such as to ensure turbulent flow. To further increase the turbulence, a pair of partitions 116, 117 can be provided at axially spaced locations within the bore 130. While the apertures $d$ and $a$ of these partitions can be of stepped cross-section, it is preferred to construct them as elongated slots whose planes intersect one another at an angle. I have found that this structure not only promotes turbulence for the purposes previously indicated, but, in addition, applies a tangential component of movement to the liquid stream so that the resulting vortex effectively bars the formation of humps at the workpiece. While the systems of FIG. 7–9 all are operable with gas injection rearwardly of the outlet, I have also found that the use of a constriction 118 in a partition 119 of an electrode 120 produces a reduced-pressure region 121 forwardly of this partition. The electrode can, therefore, be provided with a plurality of air-inlet passages 122 terminating at this reduced-pressure compartment so that bubbles of air can be induced into the electrolyte stream discharged to the outlet 123. The plenum serving to supply air to the electrode is thus the ambient atmosphere. The electrode system of FIG. 10 is of particulate suitability as a consequence of the fact that the bubbles formed in the electrolyte at the reduced-pressure compartment tend to be of a relatively large size and to decrease in diameter as the electrolyte streams through the junction between the outlet 123 and the working gap 124, i.e., the region of the hump 125. As the electrolyte travels outwardly through the gap, the bubbles increase in diameter. This progressive decrease and increase in bubble size has been found to further augment the dislodgment of the contaminants and to promote efficient electrochemical machining.

FIG. 11 shows a system in which the electrode 126 is provided with a jacket 127 into which gas is forced under pressure and is supplied to the electrolyte proximal to the outlet 128 of the electrode. Electrolyte is fed to the bore 129 of electrode 126 via a tube 130 while the electrode cooperates with means for applying mechanical vibration thereto as previously described. This means includes a magnetically permeable plate 131 supported by springs 132 and acted upon by an electromagnetic coil 133 energized by a low-frequency source 134 (10 cycles/sec. to 10 kilocycles/sec.). A centering membrane 134 connects the plate 131 to the housing 135 and supplements the springs 132.

The electrode 140 of FIG. 12 is provided with a rack 141 in mesh with a pinion 142 of a motor 143 for adjustment of the position of the electrode relatively to the workpiece 144. In this system, however, the gas introduced via a jacket 145 and gas passages 146 is directed downwardly and inwardly so as to draw electrolyte into the electrode 140 via an injector 147. The latter constitutes a constriction promoting turbulence in the mixing compartment 148. The gas-control valve 149 which, in this case, regulates both the gas and electrolyte flow is operated by a diagrammatically illustrated servo system 150 in circuit with an adjusting potentiometer 151 in response to the width of the gap 152 between the electrode and the workpiece. When this gap increases, valve 149 opens to increase the rate of gas flow and the flow of electrolyte entrained thereby through the gap.

EXAMPLE I

A brass electrode having an outside diameter of 15 mm. and an inside diameter of 3 mm. is juxtaposed with a high-carbon steel workpiece with a working gap of about 250 microns. The electrolyte, a 25%-solution of sodium chloride in water, is circulated through an electrode at 10 liters/minute and a voltage of 15 volts at a current density of 100 amps/cm.$^2$ is applied. In a period of about 2 minutes, electrolytic erosion proceeds to a depth of 3 mm. The surface was found to have a plurality of radial ridges (i.e., so-called spider webs) of a height on the order of 1–2 mm. as well as a conical peak in the central area.

EXAMPLE II

The method of Example I is followed except that air at a pressure of 15 kg./cm.$^2$ is introduced into the electrolyte to produce bubbles having a diameter ranging between approximately 8 and 100 microns. The 1 mm./min. machining speed at the depth of 3 mm. in the direction transverse to the electrode was similar to that of Example I but ridges were for the most part eliminated; in some cases, however, ridges having a height of less than 0.2 mm. were found.

EXAMPLE III

The method of Example I is followed except that an ultrasonic transducer as illustrated in FIG. 1 is employed. The oscillations of this transducer are at a frequency of 68 kilocycles/second with a power of 80 watts. A 1 mm./min. machining speed is obtained with an electrolyte flow rate of about 6 to 8 liters/min. The resulting ridges were found to have a maximum height of about 0.4 mm.

EXAMPLE IV

The method of Example III is followed except that air at a pressure of 15 kg./cm.$^2$ is introduced into the electrolyte in the electrode together with the application of ultrasonic vibrations to the electrolyte by he transducer. The machining speed is then found to be 10–20% greater. In some tests, no ridges or ribs were produced while in other tests ridges having a maximum height of about 0.1 to 0.2 mm. were observed.

EXAMPLE V

The method of Example I is followed except that a vibration of 100 cycles/sec. is applied to the electrode in accordance with the systems of FIGS. 1 and 11. The electrode stroke is 0.05 to 0.2 mm. The pressure of the electrolyte can be reduced from 12 kg./cm.$^2$ to 6 kg./cm.$^2$. The electrolyte temperature was 18° C. while the current density was 160 amp/cm.$^2$. With a gas flow (air) rate of 3.0 liters/min., air, nitrogen and carbon dioxide were employed without noticeably different effects. While the machining speed was similar to that of Example I, all of the radial ridges were substantially entirely eliminated.

EXAMPLE VI

Results similar to those obtainable with the system of Example II were obtained when an electrode of the type illustrated in FIG. 9 was employed in the system of Example I. The workpiece was hardened steel while the electrolyte was a 25%-aqueous solution of sodium chloride. Ultrasonic vibrations ranging between 50 and 500 kilocycles/sec. at 50–500 amp/cm.$^2$ were employed. In every case the use of ultrasonic frequencies resulted in at least a reduction in ridge height in excess of 30% with a machining accuracy of 0.2 mm. radius. A further improvement was obtained with the electrode of FIG. 9 when the diameter of aperture $a$ was about 5 mm., the diameter of aperture $d$ was about 10 mm. and the diameter $c$ of outlet 115 was about 3 mm. with a distance $b$ of about 20 mm.

The invention described and illustrated is believed to admit of many modifications within the ability of persons skilled in the art, all such modifications being considered within the spirit and scope of the appended claims.

I claim:

1. A method of machining a conductive workpiece, comprising the steps of spacedly, juxtaposing an electrode with a surface of said workpiece, passing an electrolyte through said gap between the opposed surfaces of said electrode and said workpiece, injecting a gas into the electrolyte prior to its entry to said gap, passing an electrical current across said surfaces to remove electrolytically portions of said workpiece, maintaining a relative feed movement between said electrode and workpiece as material is removed, sensing gap voltage which is representative of gap spacing, and increasing and decreasnig the flow of gas and of electrolyte through said gap responsive to said gap voltage in a manner proportioned to gap spacing whereby the current density in said gap is maintained substantially constant during machining.

2. A method of machining a conductive workpiece, comprising the steps of spacedly juxtaposing an electrode with a surface of said workpiece, passing an electrolyte flow through said gap between said surfaces, injecting a gas into the electrolyte prior to its entry to said gap, passing a current across said surfaces to remove electrolytically portions of said workpiece; maintaining a relative feed movement between said electrode and said workpiece, sensing gap voltage which is representative of gap spacing, and varying the flow of gas into said electrolyte responsive to gap voltage in a manner which is a direct function of gap spacing whereby gap current density is maintained substantially constant during machining.

References Cited

UNITED STATES PATENTS

| | | | |
|---|---|---|---|
| 3,239,438 | 3/1966 | Voorhees | 204—143 |
| 3,252,881 | 5/1966 | Inoue | 204—222 |
| 3,284,327 | 11/1966 | Maeda et al. | 204—143 |

FOREIGN PATENTS

| | | |
|---|---|---|
| 623,865 | 2/1962 | Belgium. |
| 789,293 | 1/1958 | Great Britain. |
| 3,811,260 | 7/1963 | Japan. |
| 147,080 | 7/1962 | U.S.S.R. |

ROBERT K. MIHALEK, *Primary Examiner.*

JOHN H. MACK, *Examiner.*